Dec. 18, 1934.   J. R. STRICKLEN ET AL   1,984,818
APPARATUS FOR THE VULCANIZATION OF RUBBER TIRES AND THE LIKE
Filed Dec. 16, 1929   5 Sheets-Sheet 1

INVENTORS
John R. Stricklen
Samuel A. Frame
BY
Alfred Barger
ATTORNEY

Dec. 18, 1934.  J. R. STRICKLEN ET AL  1,984,818
APPARATUS FOR THE VULCANIZATION OF RUBBER TIRES AND THE LIKE
Filed Dec. 16, 1929  5 Sheets-Sheet 2

INVENTORS
John R. Stricklen
Samuel A. Franie
BY
Alfred Burger
ATTORNEY

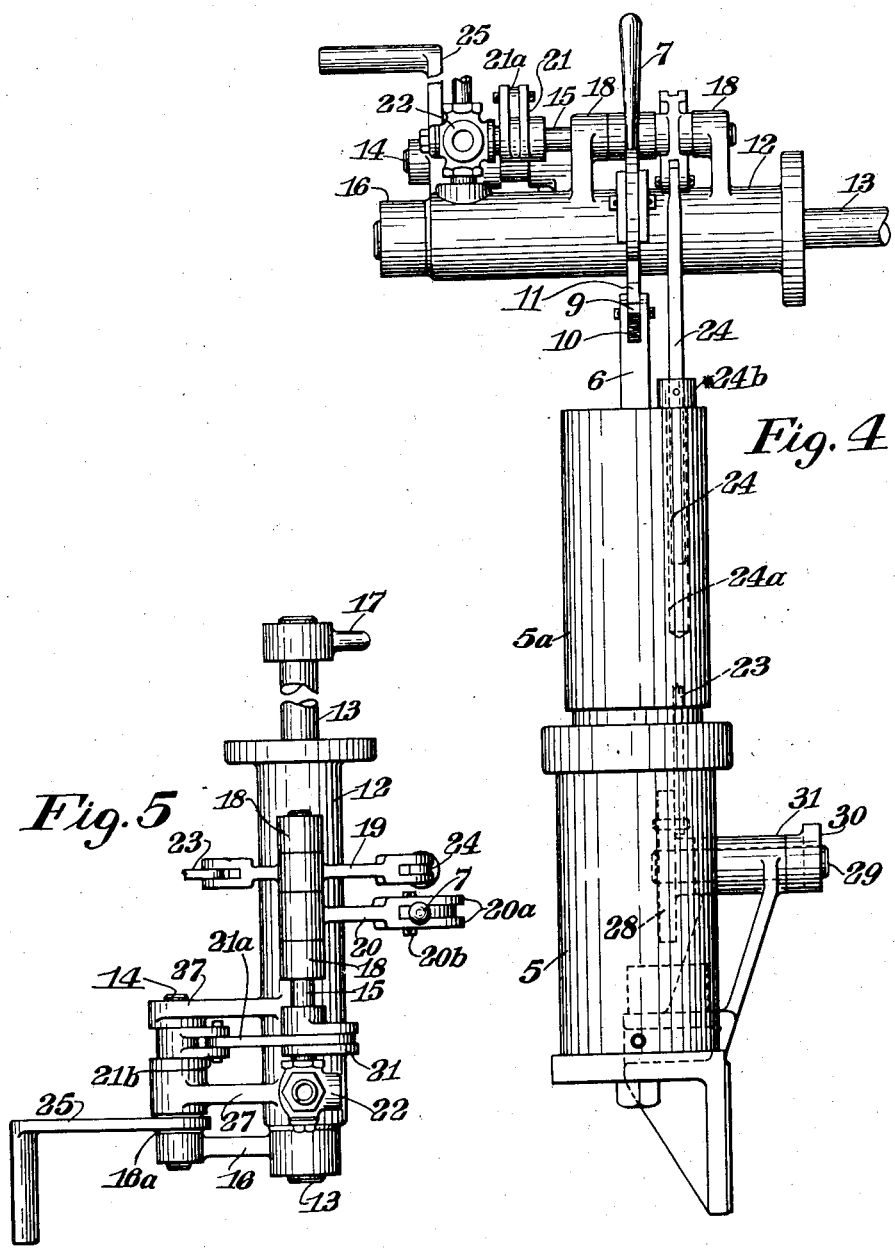

Dec. 18, 1934.  J. R. STRICKLEN ET AL  1,984,818
APPARATUS FOR THE VULCANIZATION OF RUBBER TIRES AND THE LIKE
Filed Dec. 16, 1929  5 Sheets-Sheet 5

INVENTORS
John R. Stricklen
Samuel A. Fraine
BY
Alfred Burger
ATTORNEY

Patented Dec. 18, 1934

1,984,818

UNITED STATES PATENT OFFICE 1,984,818

APPARATUS FOR THE VULCANIZATION OF RUBBER TIRES AND THE LIKE

John R. Stricklen and Samuel A. Fraine, Akron, Ohio, assignors to Taylor Instrument Companies, Rochester, N. Y., a corporation of New York Application December 16, 1929, Serial No. 414,302

15 Claims. (Cl. 18—17)

This invention relates to apparatus of the type used for the vulcanization of rubber tires and tubes and more in particular to mechanism for automatically controlling the cycle of operation for carrying out the vulcanization. The invention finds special application in that form of vulcanizing apparatus in which tires are singly treated and an operator has charge of a certain number of vulcanizing units.

It is the general object of the invention to provide a vulcanizing apparatus which reduces the amount of attention and care on the part of the operator to an irreducible minimum.

The principal object of the invention is the provision of means for safeguarding the operator against danger incident to the application of hot fluids under high pressure.

For a full understanding of the invention, the principle of operation on which it is based and its engineering significance reference is made to the accompanying drawings, wherein Fig. 1 is a side elevation of an apparatus embodying the invention, the apparatus being shown in its normally open position;

Figs. 3, 4 and 5 are a side view, end view and top view, respectively, on a larger scale of the most essential part of the invention.

Figure 1:
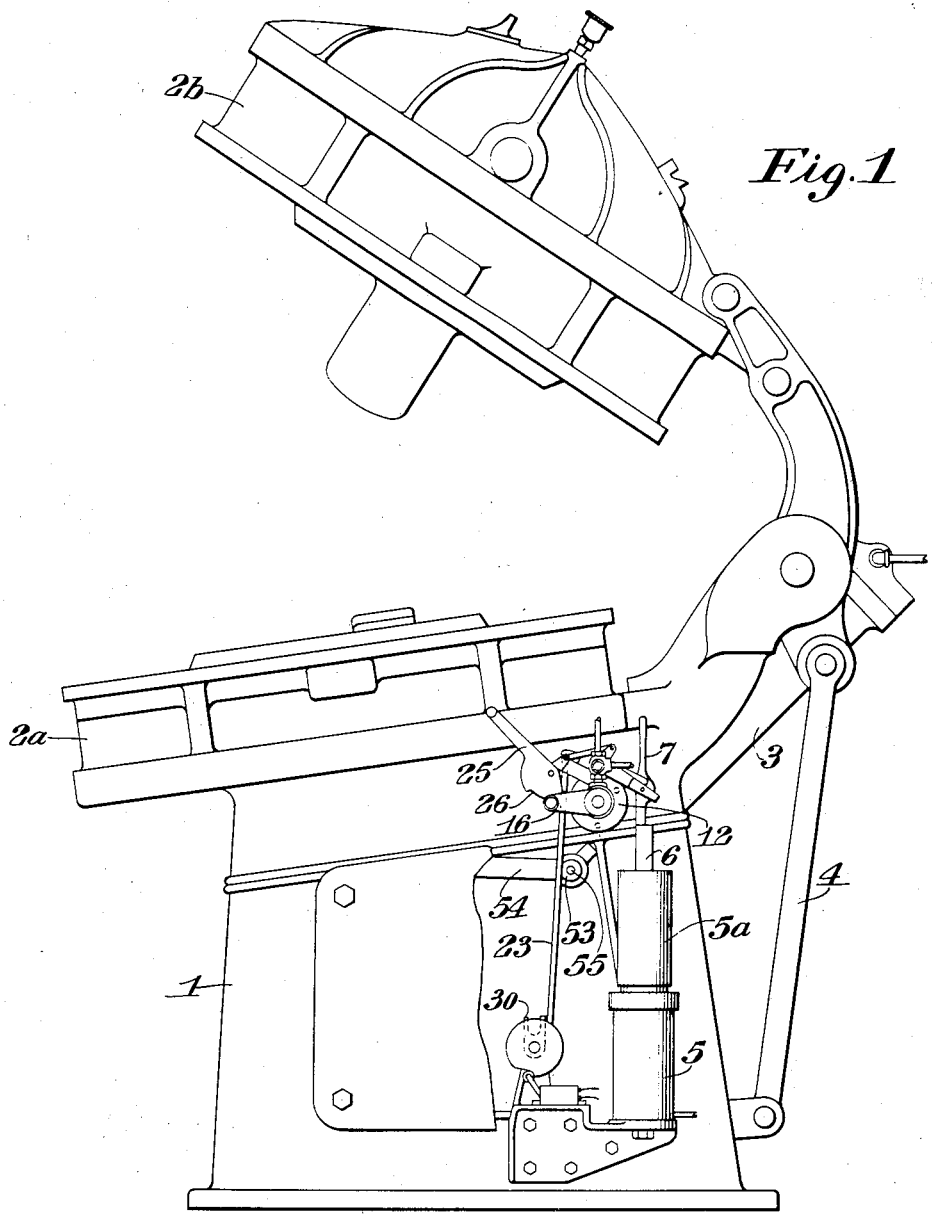
Figure 2:
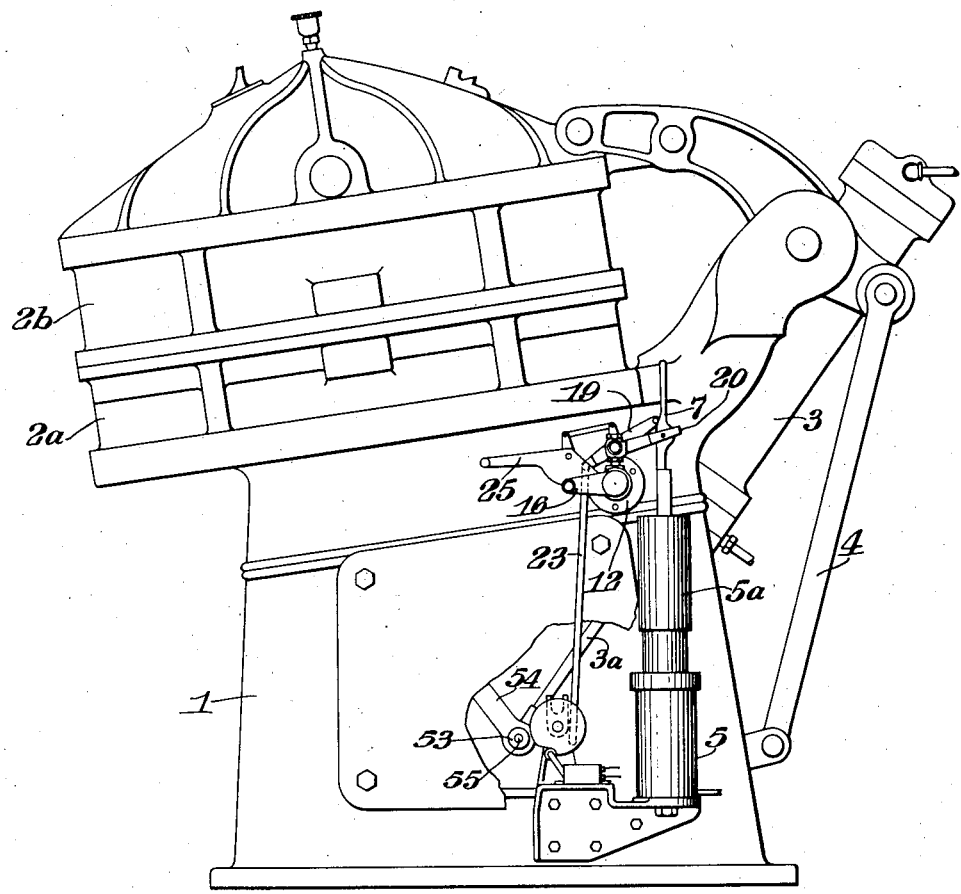
Fig. 2 is a similar view of the apparatus in closed position.

Having reference to Figs. 1 and 2, the drawings show a vulcanizing apparatus of the well known form, composed of a supporting base 1, two complementary mold holders 2a and 2b pivotally interconnected for movement toward and away from each other and means including a hydraulic cylinder 3 for operating the mold holders to close and open the apparatus. The cylinder 3 is bodily mounted on the mold holder 2b and the motion of the piston is transmitted through the piston rod 3a and a lever system including the connecting link 4 to the mold holder 2b, the mold holder 2a being stationary. The cylinder 3 is actually mounted on the holder 2b and moves with it. However, since it is located very close to the pivot of holder 2b, its angular motion is very small and its longitudinal motion is very small. The latter, of course, is merely added to or subtracted from the stroke of the piston and is computed as a part of the piston stroke. The angular motion of the piston 3a due to the angular motion of the cylinder 3 is taken care of by a special link system. These features do not form part of the invention, but are parts of the press which itself is well known and was in operation before the present invention came into existence.

The apparatus so far described is well known and does not form a part of the invention. The invention proper has to do with various auxiliary mechanisms for making the operation automatic and more in particular for making the automatic operation absolutely safe and practically foolproof.

Figure 3:
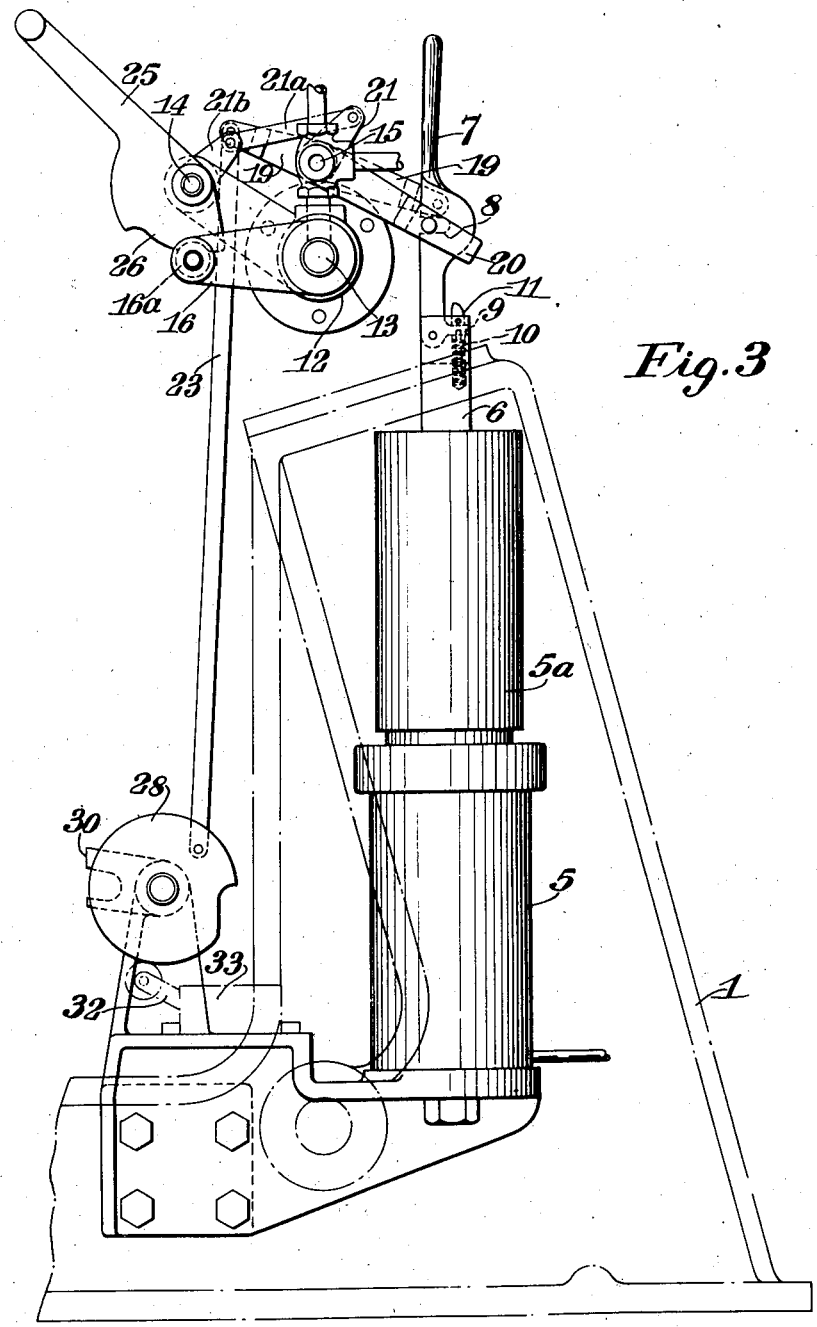

This auxiliary mechanism, which is principally shown on a larger scale in Figs. 3-5, includes the following:

A hydraulic cylinder 5, the piston 5a of which extends upwardly, is attached to the base 1. The piston carries at its upper end a stud 6 on which is pivotally supported a handle 7 provided with a substantially horizontal slot 8. The handle 7 is provided near its pivot with a heel 9 abutting against a spring 10 whereby the handle may be turned to the right or generally in a direction opposite to that in which the slot 8 opens. A block 11 limits the angular movement of the handle 7 in opposite directions.

On the base 1, close to the handle 7 is mounted by means of a tubular stud 12 a composite mechanism including primarily a shaft 13, a shaft 14 and a shaft 15. The shaft 13 extends through the tubular stud 12 and carries at its front end a crank arm 16 and at its opposite end an arm 17. The shaft 15 is supported in bearings 18 which are connected with or form part of the tubular stud 12. A lever 20 and an arm 21 are secured to shaft 15, while the beam 19 is loosely mounted thereon. This shaft at its front end is provided with the movable part of a rotary valve mechanism 22.

The beam 19 is pivotally connected at one end with a rod 23 and at its other end with a rod 24. Lever 20 carries at its end a pair of jaws 20a containing a transverse pin 20b. The jaws 20a are spaced to receive the slotted portion of the handle 7 and the pin 20b fits the slot 8. The arm 21 is connected through link 21a and the arm 21b with the shaft 14 which at its front end carries a crank arm 25 formed to define a cam edge 26. The latter cooperates with a roller 16a carried at the free end of the arm 16 and laterally thereof. Shaft 14 is supported by brackets 27 on the stud 12.

Rod 23 is connected at its lower end with a cam disk 28 which is mounted at one end of a shaft 29 at the other end of which is mounted a bifurcated arm 30, the shaft being supported in a bearing 31 preferably attached to base 1.

Rod 24 extends downwardly into a well 24a in the piston 5a and is provided with an adjustable collar 24b forming an abutment for cooperation with the upper surface of the piston or a definite abutting surface thereof.

The cam disk 28 has its cam edge formed for cooperation with a roller or the like constituting the end of a lever 32 by which an electric switch mechanism 33 may be opened and closed as the case may be.

The operation of the mechanism described may be best explained in connection with the diagrammatic illustration of Fig. 6.

The vulcanizing apparatus or commonly termed "press" is normally open to receive the tire for curing. All the operator has to do, is to place the tire into the mold holder 2a and then turn the crank arm 25 to the left while pulling the handle 7 to the right. This construction constitutes a two-hand control since both hands of the operator must be simultaneously applied to the handles 7 and 25, thereby ensuring that the operator's hands will not be injured between the parts 2a and 2b of the apparatus. Thereafter the operation is automatic until the end of the curing cycle when the whole mechanism is again in its initial position, i. e. ready for starting.

When the press is open, the piston in cylinder 3 is in its uppermost position and the lower end of the piston rod is usually interlocked by means of a spring actuated latch (not shown) with another part of the mechanism so as to secure the press in open position.

The crank arm 25 and the mechanism connected with it, at the end of the curing cycle are left in the position shown in Fig. 3. To turn the crank arm 25 to the left, the handle 7 must be pulled to the right so as to free the pin 20b from the slot 8. As soon as the pin 20b is out of the slot 8, the crank arm 25 is free to turn, imparting angular movement to the shafts 15 and 14, the lever 20 and the link system 21, 21a and 22b. At the same time, the cam edge 26 of the crank 25 acts upon the roller 16a of arm 16 to depress it and thereby cause a corresponding movement of shaft 13 together with arm 17 at the rear end thereof.

The shaft 15 acting at its forward end as the rotary member of valve 22, its angular movement causes movement of the latter.

Figure 6:
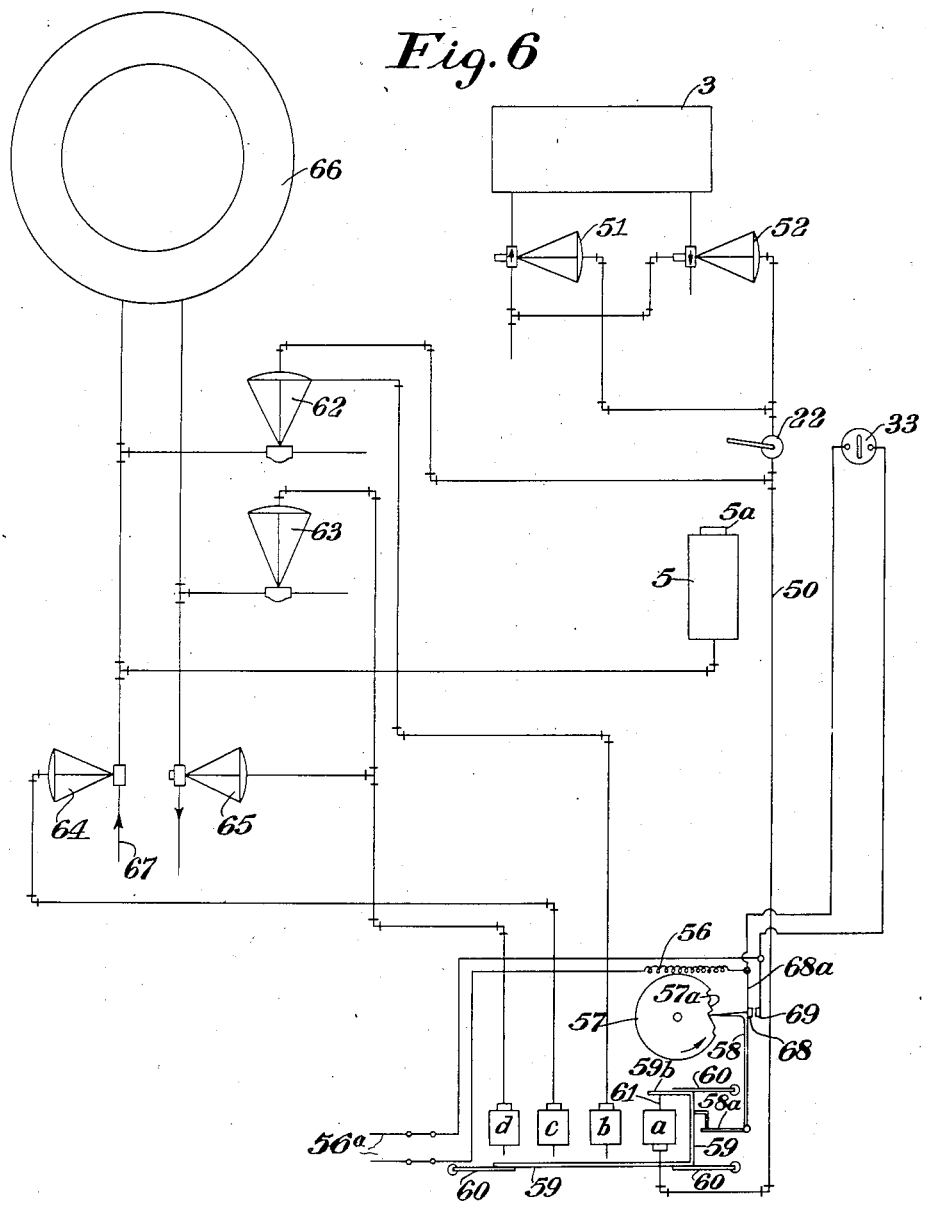
Fig. 6 is a diagrammatic representation of the mechanism for operating the apparatus.

Having now reference to Fig. 6, a, b, c and d represent four relay air valves controlling the supply of compressed air to a plurality of diaphragm valves which in turn control the flow of various fluid media as will be more fully explained. The valve a is normally open, i. e. open at the end of an operating cycle and remains open until acted upon in the course of the next cycle. Air normally flows from the supply (not indicated) through the conduit 50 and via the valve 22 to two diaphragm valves 51 and 52 which control the flow of water to and from the hydraulic cylinder 3 effecting the closing and opening of the press.

As indicated in the diagram of Fig. 6, valves 51 and 52 are normally so set as to allow water to flow into the one end (left end) and out at the other end of the cylinder, causing the piston to be positioned at the extreme right. In this position, the press remains open until the valve 22 is closed. When the valve 22 is closed by the movement of crank arm 25, the diaphragm valves 51 and 52 are operated to direct the water through valve 52 into the right end and out at the left end of the cylinder causing the piston to move to the left. This movement causes the closing of the press.

On the shaft or pin 53 interconnecting the piston rod 3a and lever arm 54 of the toggle transmission system, is provided a projection 55. During the closing movement of the press, this projection enters the bifurcation of arm 30 and turns the latter in counter-clockwise direction through an angle of about 90 degrees when the projection finally moves out of the bifurcation and leaves the lever 30 free to turn.

The angular movement imparted to the arm 30 causes a corresponding movement of the cam disk 28 as seen by reference to Fig. 3, which movement causes movement of the lever 32 which in turn effects the closing of switch 33. When the switch 33 is closed, the electric clock mechanism generally indicated as a coil 56, is energized from an alternating current source 56a and the cam disk 57 is thereby set in motion, starting the automatic operation of the whole mechanism.

The cam has an accurately defined cam edge 57a cooperating with a follower 58 which is essentially a bell-crank lever the arm 58a of which engages a frame 59. This frame 59 is supported on leaf springs 60 tending to maintain the frame in a definite position relatively to the relay valves a, b, c and d. As the cam rotates, the arm 58 is forced to move the frame relatively to the valves.

At the starting point, the follower 58 engages a point on the cam edge nearest to the center thereof. In the course of the rotation, diaphragm valves 62, 63, 64 and 65 are operated in the proper sequence to control the operation. In Fig. 6, 66 represents a pressure bag normally disposed in the mold holder 2a and placed within the tire to be treated.

The mechanism for controlling the operating cycle does not form a part of our invention as such except insofar as the auxiliary hydraulic cylinder 5 is interconnected with it and constitutes an operative component thereof.

As soon as the diaphragm valve 64 is opened to admit water to the bag 66 from a source of hydraulic pressure 67, the water is simultaneously admitted to the cylinder 5. The piston 5a rises as soon as the pressure in cylinder 5 exceeds a definite value, say 5 lbs., just sufficient to lift the piston against the force of gravity.

As the piston 5a rises, it bears upon collar 24b and thereby lifts rod 24 whereby through the beam 19 the rod 23 is again lowered to turn the cam disk to its original position and thereby reopen switch 33. This is necessary in order to permit the electric clock circuit to be opened at the end of the curing cycle.

The piston 5a also carries handle 7 upwardly until the slot 8 is opposite the pin 20b when handle 7 is forced to the left by spring 10 to cause the slot 8 to engage pin 20b. In this position, neither the crank arm 25 nor any other part of the whole mechanism can be operated to open the press. In fact, it is impossible to open the press until the piston 5 has again approached or reached its lowest position. So long as the pressure in the cylinder 5 and therefore in the bag 66 is above the value of say 5 lbs. i. e. the pressure necessary to lift the weight of piston 5, the piston will be maintained in its highest position.

The electric clock mechanism continues to operate after switch 33 has been reopened because a second switch is contained in the circuit, the switch consisting of the contact members 68 and 69 adapted to be closed, directly or indirectly through the movement of the follower 58. As indicated in Fig. 6, the contact members 68 and 69 are disposed in proximity to the follower 58. The contact member 68 is preferably carried by or forms part of a leaf spring 68a which causes a break of contact when the follower approaches the lowest point on the cam, which is the starting and stopping point. In all other positions of the cam 57, contact relation between members 68 and 69 is maintained.

The end of the cycle is reached when, after a complete revolution of cam disk 57, the follower is allowed to drop back to its initial position causing the contacts 68 and 69 to open and thereby interrupt the clock circuit.

At or near the end of the curing cycle, the different valves are again operated in a predetermined order to shut off the water from the bag and piston 5, drain the water from bag 66 and open the press.

The arm 17 mounted on the rear end of shaft 13 has the purpose to disengage the spring actuated latch which, as previously explained, secures the press in open position. The movement of the crank 25 at the beginning of the operation causes the arm 17 to move the latch out of locking position as a condition precedent to the closing movement of the press.

Reference to the spring latch and arm 17 have been made solely for the sake of completeness, inasmuch as they enter into the operation of the device constituting the invention. However, they are merely an adjunct and therefore do not form a material part of the invention and for this reason the relation of the arm 17 and the spring actuated latch has not been illustrated.

The embodiment of the invention above described represents only one specific mode of application. It is understood that the invention may find expression and application in various other forms.

We claim:

1. In apparatus of the character described, the combination with a treater chamber, mechanism for automatically closing and again opening the chamber according to a predetermined time schedule, and means for admitting pressure to the interior of the chamber, of means responsive to said pressure for holding the chamber against opening movement, including a vertically disposed cylinder, a piston therein having a rod extending upwardly out of the cylinder, a fluid pressure connection between the chamber and the lower end of the cylinder, means including an operating handle of a two-hand control for manually setting the said mechanism into operation and means including a locking handle of said two-hand control connected with the said rod for locking the operating handle against motion when the rod is in its uppermost position, the piston being of such weight as to release the locking means when the pressure in the chamber drops below a definite value.

2. In apparatus of the character described, the combination with a treater chamber, mechanism for automatically closing and again opening the chamber according to a predetermined time schedule, and means for admitting pressure to the interior of the chamber, of means responsive to said pressure for holding the chamber against opening movement, including a vertically disposed cylinder, a piston therein having a rod extending upwardly out of the cylinder, a fluid pressure connection between the chamber and the lower end of the cylinder, means including a handle for manually setting the said mechanism into operation and means connected with the said rod for locking the handle against motion, comprising a lever having angular movement and bearing near one end a cross-pin, a handle portion pivotally mounted upon the upper end of the rod, the said portion being provided with a slot opening to one side to receive the cross-pin and spring means acting upon the handle portion tending to press the latter toward the cross-pin, the relation of the said lever, the cross-pin thereon, the handle portion and the slot being such that engagement between the cross-pin and the slot is normally maintained throughout, but may be broken when the piston is in its lower position and cannot be broken when the piston is in its upper position.

3. In apparatus of the character described, the combination with a rotary valve, a pivotally mounted handle for operating the same and means for locking the handle against operating movement, including a lever connected with the valve for angular movement therewith, a cross-pin on the lever, a rod movable substantially in the line of the tangent to the arc described by the cross-pin, a handle portion pivotally mounted at the end of the rod for movement toward and away from the cross-pin, the said handle portion having a slot opening toward the cross-pin and normally in engagement therewith, and spring means acting upon the handle portion to maintain the engagement, the disposition of the lever, the cross-pin, the handle portion and the slot being such that the said engagement is maintained throughout the movement of the valve, but may be broken when the rod is in one position and cannot be broken when the rod is in another position.

4. In an arrangement of the character described, the combination with apparatus having an operating movement, of time-controlled mechanism for determining a cycle of operating movement of said apparatus, means including an operating hand lever and a locking hand-lever of a two-hand control jointly operable for manually initiating the operating movement of the apparatus, means movable in response to the initial movement of the apparatus for starting the said time-controlled mechanism, and means operative in the course of the cycle of operation to bring the said responsive means back to its original position.

5. In apparatus of the character described, the combination with a treater chamber and mechanism for closing and then again opening the chamber, of time-controlled mechanism operative to determine the period during which the chamber remains closed, means including an operating hand lever and a locking hand-lever of a two-hand control jointly operable for manually initiating the movement of said mechanism for closing the chamber, means movable in response to said closing movement for starting the time-controlled mechanism, and means operative in the course of the cycle of operation to bring said starting means back to its original position.

6. In apparatus of the character described, the combination with a treater chamber, mechanism for closing and then again opening the chamber, a source of pressure fluid connected with the chamber, of time-controlled means operative to determine the period during which the chamber remains closed, means including an operating hand-lever and a locking hand-lever of a two-hand control jointly operable for manually initiating the movement of said mechanism for closing the chamber, means movable in response to said closing movement for starting the time-controlled means, pressure-responsive means in connection with the chamber for locking the same against opening movement while the pressure therein exceeds a certain limit, and means operatively connected to the pressure-responsive means for resetting the starting means to its original position.

7. In apparatus of the character described, the combination with a treater chamber, means for closing and re-opening the chamber and means for manually initiating the closing movement of said means, of a time-cycle regulator including an electric clock for determining the period during which the chamber remains closed, a circuit for energizing said clock, a primary means movable in response to said closing movement for initially completing said circuit, a secondary means operative in response to the operation of the regulator for maintaining said circuit effective independently of the said primary means, and means for resetting the said primary means after the secondary means has been made effective.

8. In apparatus of the character described, the combination of a treater chamber, a time-cycle regulator including an electric clock, a circuit for energizing the same, a primary means movable to initially close circuit, a secondary means operatively connected with the regulator for maintaining said circuit closed independently of the primary means, a pressure-operated piston responsive to pressure conditions within said chamber and operatively associated with the regulator, and means operated by said piston for resetting the primary means when the secondary means has been made effective.

9. In apparatus of the character described, the combination with a treater chamber, actuating mechanism for closing and opening the chamber, a two-hand controlled means including a starting handle and a locking handle therefor, a source of pressure fluid connected with the chamber, time-controlled means operative to determine the period during which the chamber remains closed and normally operative to cause said mechanism to open said chamber, means including said starting handle and said locking handle jointly operable for manually initiating the movement of said actuating mechanism for closing the chamber, means operable in response to said closing movement for starting the time-controlled means, and pressure-responsive means in connection with the chamber for locking the chamber against opening movement while the pressure therein exceeds a certain limit.

10. In apparatus of the character described, the combination with a treater chamber, mechanism for closing and opening the chamber, a source of pressure fluid connected with the chamber, time-controlled means including an electrical motor operative to determine the period during which the chamber remains closed and normally operative to cause such mechanism to open said chamber, means including a circuit for operating said motor, means comprising an operating hand-lever and a locking hand-lever therefor jointly operable for manually initiating the movement of said mechanism for closing the chamber, a switch in said circuit closed at the time of the closing of said chamber for starting the time-controlled means, a second switch actuated by said time-controlled means for closing said circuit independently of said first switch, and pressure-responsive means in connection with the chamber for locking the same against opening movement while the pressure therein exceeds a certain limit.

11. In apparatus of the character described, the combination with a treater chamber, mechanism for closing and opening the chamber, a source of pressure fluid connected with the chamber, time-controlled means including an electrical motor operative to determine the period during which the chamber remains closed and normally operative to cause said mechanism to open said chamber, means including a circuit for operating said motor, means including an operating hand-lever and a locking hand-lever therefor jointly operable for manually initiating the movement of said mechanism for closing the chamber, a switch in said circuit closed responsive to the closing of said chamber for starting the time-controlled means, a second switch actuated by said time-controlled means for closing said circuit independently of said first switch, and pressure-responsive means in connection with the chamber for locking the same against opening movement while the pressure therein exceeds a certain limit.

12. In apparatus of the character described, the combination with a treater chamber, mechanism for closing and opening the chamber, a source of pressure fluid connected with the chamber, time-controlled means including an electrical motor operative to determine the period during which the chamber remains closed, means including a circuit for operating said motor, means including an operating hand lever and a locking hand-lever jointly operable for manually initiating the movement of said mechanism for closing the chamber, a switch in said circuit closed in response to closing of said chamber for starting the time-controlled means, a second switch actuated by said time-controlled means for closing said circuit independently of said first switch, pressure-responsive means in connection with the chamber for locking the same against opening movement while the pressure therein exceeds a certain limit, and means operatively connected to the pressure-responsive means for opening said first-mentioned switch.

13. In a vulcanizer comprising separable sections, a two hand control comprising a hand lever for starting the initial operation and closing of the sections, a locking hand lever releasably preventing manual movement of said first named lever, and power means connected to said locking lever for causing operative movement of said first named lever to open the vulcanizer sections.

14. In a vulcanizer press for hollow articles, relatively movable mold sections, means for supplying pressure to the interior of the hollow article to cause it to properly fill the mold cavity, actuating means for effecting the opening and closing of the press, mechanism including an operating hand-lever and a locking hand-lever jointly operable for controlling said actuating means, and means interconnecting said opening and closing means and said pressure supplying means preventing the operation of the mold opening means as long as pressure is supplied to the interior of the hollow article and for automatically effecting the opening of the vulcanizer when said pressure in the article reaches a determinate minimum.

15. In apparatus of the character described, the combination with a treater chamber, means for closing and opening the chamber, and manual means for initiating the closing movement of said means, of a time cycle regulator including an electric clock for determining the period during which the chamber remains closed, a circuit for energizing said clock, a primary means controlled by said manual means for initially completing said circuit, a secondary means operative in response to the operation of the regulator for maintaining said circuit effective independently of said primary means.

SAMUEL A. FRAINE.
JOHN R. STRICKLEN.